(12) United States Patent
Soga

(10) Patent No.: US 11,842,534 B2
(45) Date of Patent: Dec. 12, 2023

(54) INFORMATION PROCESSING APPARATUS FOR OBTAINING CHARACTER STRING

(71) Applicant: CANON KABUSHIKI KAISHA, Tokyo (JP)

(72) Inventor: Masaya Soga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 17/211,659

(22) Filed: Mar. 24, 2021

(65) Prior Publication Data

US 2021/0303895 A1      Sep. 30, 2021

(30) Foreign Application Priority Data

Mar. 31, 2020   (JP) ................................ 2020-063778

(51) Int. Cl.
| G06N 20/00 | (2019.01) |
| G06N 5/04 | (2023.01) |
| G06V 10/96 | (2022.01) |
| H04N 1/00 | (2006.01) |
| G06F 18/22 | (2023.01) |
| G06F 18/28 | (2023.01) |
| G06V 30/12 | (2022.01) |
| G06V 10/94 | (2022.01) |
| G06V 30/412 | (2022.01) |
| H04N 1/04 | (2006.01) |
| G06V 30/10 | (2022.01) |

(52) U.S. Cl.
CPC .............. *G06V 10/96* (2022.01); *G06F 18/22* (2023.01); *G06F 18/28* (2023.01); *G06N 5/04* (2013.01); *G06N 20/00* (2019.01); *G06V 10/945* (2022.01); *G06V 30/12* (2022.01); *G06V 30/412* (2022.01); *H04N 1/00331* (2013.01); *G06V 30/10* (2022.01); *H04N 1/04* (2013.01); *H04N 2201/0094* (2013.01)

(58) Field of Classification Search
None
See application file for complete search history.

(56) References Cited

U.S. PATENT DOCUMENTS

| 8,331,739 | B1 * | 12/2012 | Abdulkader | ......... G06V 30/248 |
| | | | | 358/1.11 |
| 2019/0138592 | A1 * | 5/2019 | Sareen | ............. G06V 30/19173 |
| 2022/0292857 | A1 * | 9/2022 | Tanaka | ................. G06V 30/133 |

FOREIGN PATENT DOCUMENTS

| JP | 62051866 A | 3/1987 |
| JP | 2007503032 A | 2/2007 |

* cited by examiner

*Primary Examiner* — Dov Popovici
(74) *Attorney, Agent, or Firm* — Canon U.S.A., Inc., IP Division

(57) ABSTRACT

Correction content is made learnable based on a correction operation performed by a user on an attribute setting screen in setting attribute information, such as a filename, based on a character string obtained by character recognition processing on a scan image.

15 Claims, 14 Drawing Sheets

FIG.6A

SCANNED FORM LIST — 600

- 602 SEND
- 603 EDIT
- 604 DELETE

| FORM NAME (605) | DESTINATION (606) | STATUS (607) | TYPE (608) |
|---|---|---|---|
| 001 | CLOUD STORAGE A | NOT LEARNED | QUOTATION |
| 002 | CLOUD STORAGE A | NOT LEARNED | QUOTATION |
| 003 | CLOUD STORAGE A | LEARNED | INVOICE AAA |
| 004 | CLOUD STORAGE A | NOT LEARNED | QUOTATION |
| 005 | CLOUD STORAGE A | LEARNED | INVOICE BBB |

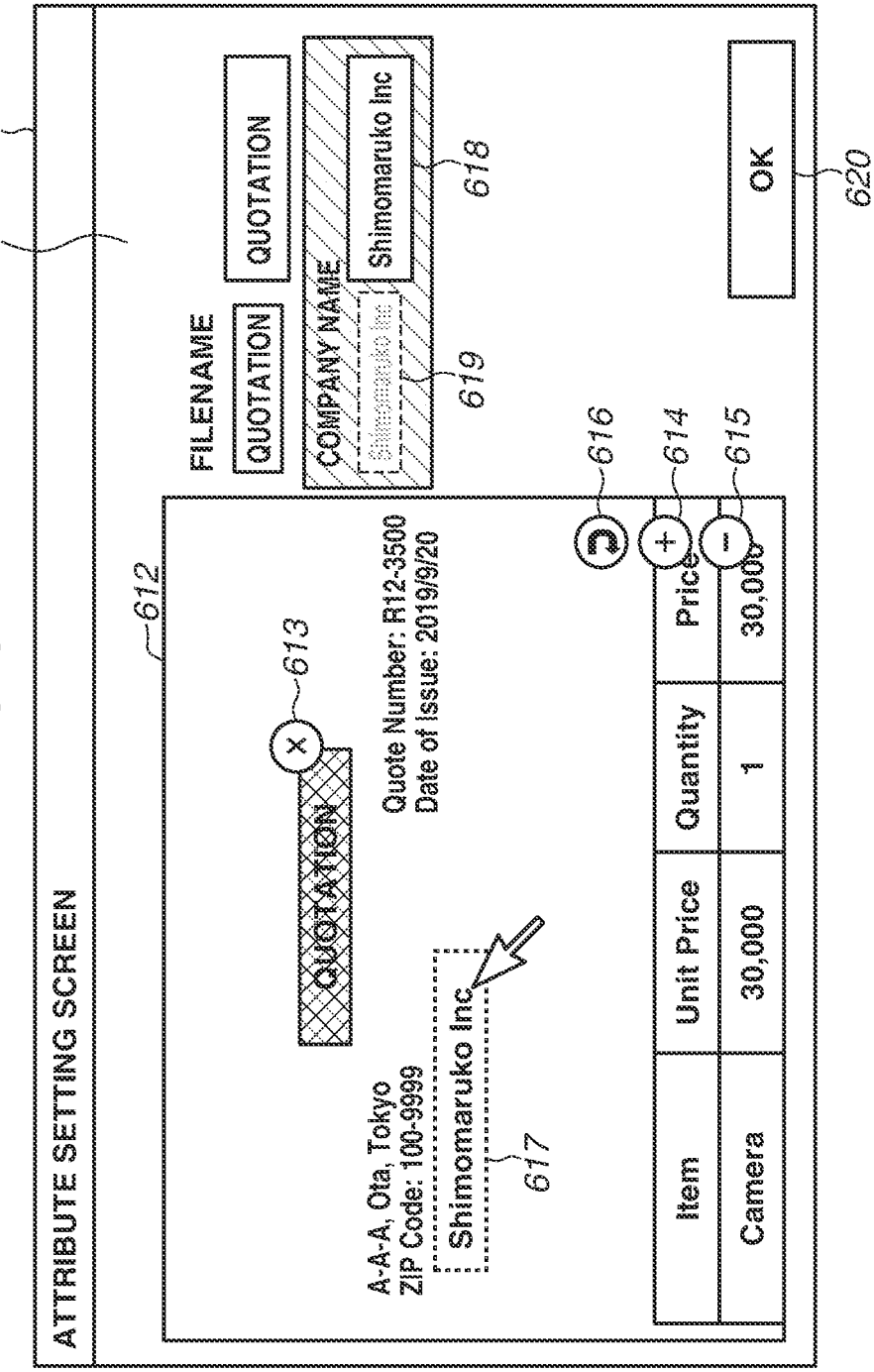

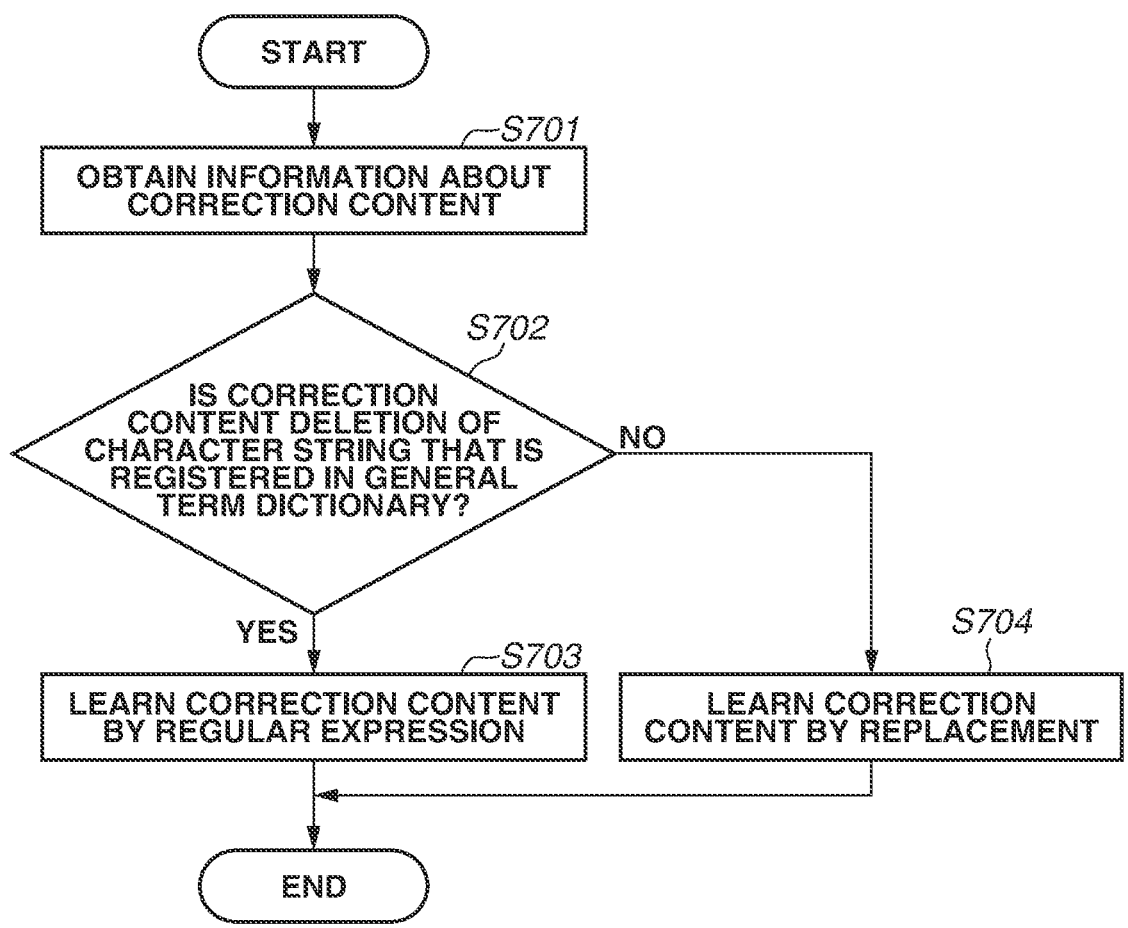

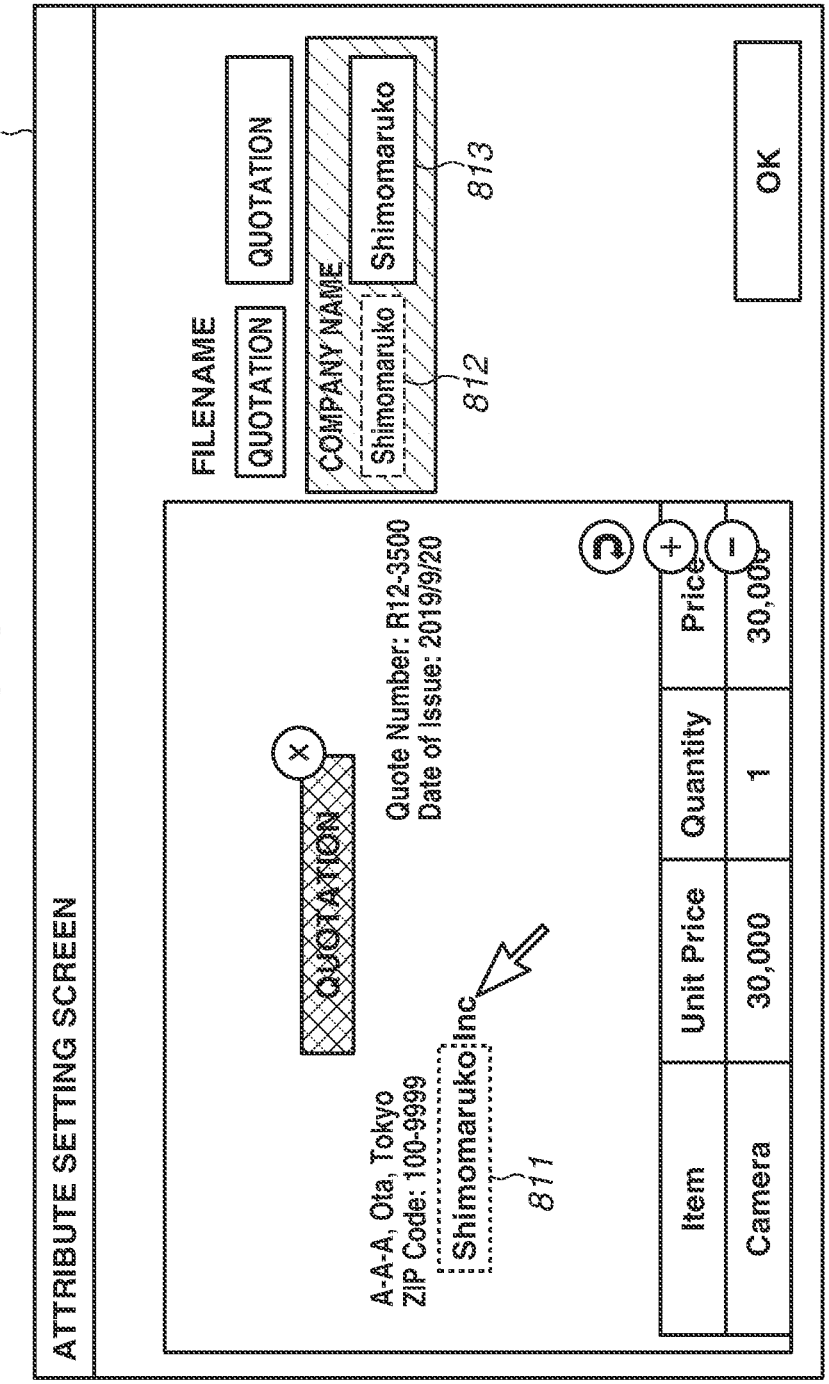

FIG.10

ATTRIBUTE SETTING SCREEN

FILENAME: QUOTATION

COMPANY NAME: Kosugi (1012) / Kosugi (1013)

QUOTATION
B-B-B, Kawasaki, Kanagawa
ZIP Code: 200-9999
Kosugi Inc (1011)
Quote Number: R13-4000
Date of Issue: 2019/9/29

| Item | Unit Price | Quantity | Price |
|------|-----------|----------|-------|
| Camera | 30,000 | 2 | 60,000 |

OCR PROCESSING RESULT DATA

```
{
  "imageWidth": 2490,
  "imageHeight": 3515,
  "regions": [
    {
      "rect": {
        "x": 1019,
        "y": 303,
        "width": 192,
        "height": 55
      },
      "text": "QUOTATION"
    },
    {
      "rect": {
        "x": 301,
        "y": 550,
        "width": 143,
        "height": 55
      },
      "text": "Kosugi"
    },
    {
      "rect": {
        "x": 445,
        "y": 550,
        "width": 243,
        "height": 55
      },
      "text": "Inc"
    },
    {
      "rect": {
        "x": 1584,
        "y": 446,
        "width": 143,
        "height": 36
      },
      "text": "Quote Number:"
    },
    {
      "rect": {
        "x": 1874,
        "y": 443,
        "width": 230,
        "height": 36
      },
      "text": "R13-4000"
    }
NOTE: AS MANY ELEMENTS AS NUMBER OF TEXT REGIONS ARE ADDED TO "regions"
  ]
}
```

FIG.12

ATTRIBUTE SETTING SCREEN  1210

FILENAME: INVOICE

COMPANY NAME: Kawasaki Inc ▼
- Kawasaki Inc
- Kawasaki

1212

Invoice Number: R14-4000
Date of Issue: 2019/10/11

INVOICE

B-B-B, Yokohama, Kanagawa
ZIP Code: 300-9999
Kawasaki Inc  1211

| Item | Unit Price | Quantity | Price |
|---|---|---|---|
| Printer | 20,000 | 1 | 20,000 |

OK

FIG.13 OCR PROCESSING RESULT DATA

```
{
  "imageWidth": 2490,
  "imageHeight": 3515,
  "regions": [
    {
      "rect": {
        "x": 1009,
        "y": 305,
        "width": 202,
        "height": 55
      },
      "text": "INVOICE"
    },
    {
      "rect": {
        "x": 1401,
        "y": 550,
        "width": 443,
        "height": 45
      },
      "text": "Kawasaki Inc",
      "candidate": [
        {
          "target": true,
          "rect": {
            "x": 1401,
            "y": 550,
            "width": 145,
            "height": 55
          },
          "text": "Kawasaki"
        },
        {
          "target": false,
          "rect": {
            "x": 1545,
            "y": 550,
            "width": 298,
            "height": 55
          },
          "text": "Inc"
        }
      ]
    },
    {
      "rect": {
        "x": 284,
        "y": 446,
        "width": 143,
        "height": 36
      },
      "text": "Invoice Number:"
    },
    {
      "rect": {
        "x": 430,
        "y": 443,
        "width": 230,
        "height": 36
      },
      "text": "R14-4000"
    }
NOTE: AS MANY ELEMENTS AS NUMBER OF TEXT REGIONS ARE ADDED TO "regions"
  ]
}
```

INFORMATION PROCESSING APPARATUS FOR OBTAINING CHARACTER STRING

BACKGROUND

Field

The present invention relates to an apparatus, a method, and a storage medium for obtaining a desired character string based on a character recognition result of a scan image.

Description of the Related Art

There has conventionally been a system that sets a filename of a form image obtained by scanning a paper from, based on a recognition result obtained by performing character recognition processing on the form image. Japanese Patent Application Laid-Open No. S62-051866 discusses performing character recognition processing on a predetermined region in a form image and using the result of the character recognition processing as the filename of the form image. Japanese Patent Application Laid-Open No. 2007-503032 discusses imposition of file naming rules in performing optical character recognition (OCR) on an extraction region selected by a user's specification and using the OCR result as a filename. As the file naming rules, Japanese Patent Application Laid-Open No. 2007-503032 discusses imposing conditions on the length of the filename (maximum length and minimum length), deleting prohibited characters, and preventing reuse of the same filename.

However, the technique discussed in Japanese Patent Application Laid-Open No. 2007-503032 involves setting in advance the conditions such as characters prohibited from a filename use. Thus, it has been difficult for the user to flexibly set the conditions by using recognition results of form images.

SUMMARY

An information processing apparatus according to one aspect of the present disclosure comprises: character recognition means for obtaining a character recognition result by performing character recognition processing on a text region in a first scan image; and learning means for, if a correction is made to at least a part of a character string of the character recognition result in setting attribute information about the first scan image by using the character recognition result obtained by the character recognition means, learning correction content of the correction, wherein the character recognition means is configured to, if the character recognition processing is performed on a text region in a second scan image, correct a character recognition result of the text region in the second scan image based on the correction content learned by the learning means, and output the corrected character recognition result.

Further features of the present disclosure will become apparent from the following description of exemplary embodiments with reference to the attached drawings.

BRIEF DESCRIPTION OF THE DRAWINGS

FIGS. 6A and 6B are diagrams illustrating examples of screens displayed on the MFP or the client PC.

FIG. 7 is a flowchart illustrating details of processing for learning a correction to a character recognition result.

FIG. 8 is a diagram illustrating an example of an attribute setting screen when a character recognition result is corrected.

FIG. 10 is a diagram illustrating an example of the attribute setting screen.

FIG. 11 is a diagram illustrating details of data output as a character recognition result.

FIG. 12 is a diagram illustrating an example of the attribute setting screen.

FIG. 13 is a diagram illustrating details of data output as a character recognition result.

DESCRIPTION OF THE EMBODIMENTS

<System Configuration>

Figure 1:
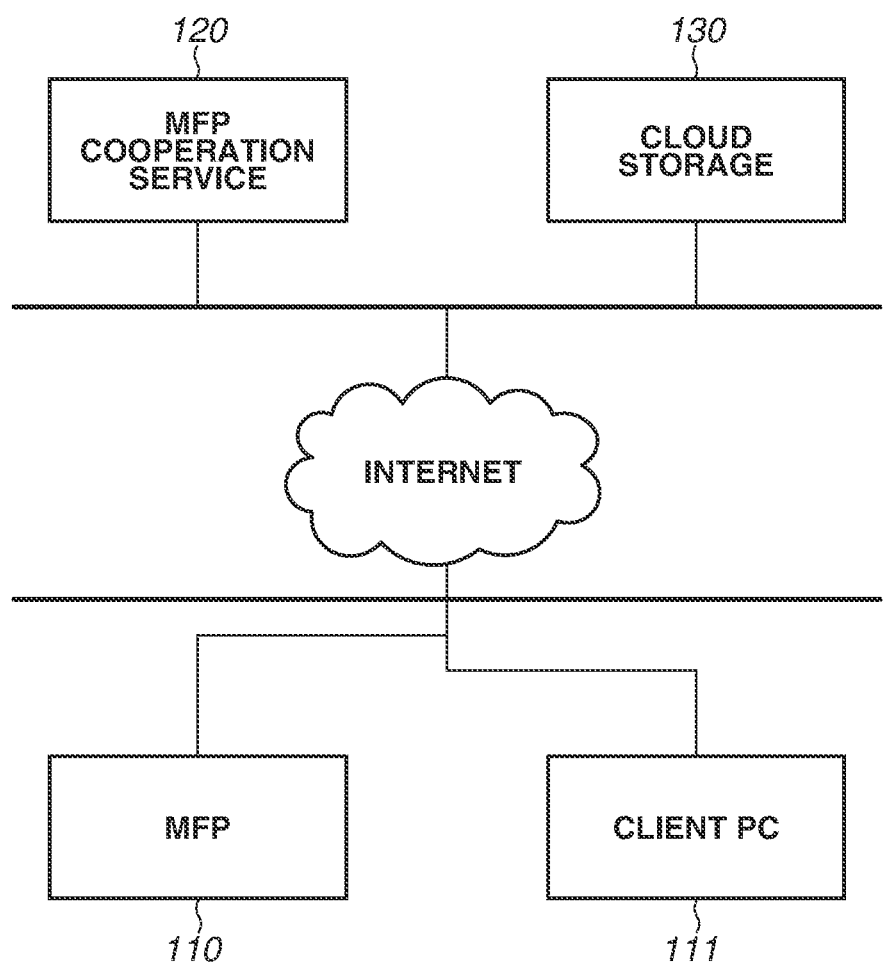
FIG. 1 is a diagram illustrating an overall configuration of a system.

FIG. 1 is a diagram illustrating an overall configuration of a system for implementing an exemplary embodiment of the present invention. An image processing system includes a multifunction peripheral (MFP) 110, a client personal computer (PC) 111, an MFP cooperation service 120, and a cloud storage 130. The MFP 110 and the client PC 111 are communicably connected to servers for providing various services on the Internet (such as the MFP cooperation service 120 and the cloud storage 130) via a local area network (LAN).

The MFP 110 has a plurality of functions such as a scanner function and a printer function, and is an example of an image processing apparatus. The client PC 111 is a computer that executes an application program for receiving provision of a service requested of the MFP cooperation service 120. The MFP cooperation service 120 is an example of a service having a function of storing image files scanned by the MFP 110 in a server of the MFP cooperation service 120 or transferring the image files to a service capable of storing a file, such as another storage service. The cloud storage 130 is a service capable of storing files via the Internet and obtaining files via a web browser.

While the image processing system according to the present exemplary embodiment includes the MFP 110, the client PC 111, the MFP cooperation service 120, and the cloud storage 130, the configuration of the image processing system is not limited thereto. For example, the MFP 110 may also serve as the client PC 111 and/or the MFP cooperation service 120. With regard to a connection configuration, the MFP cooperation service 120 may be located on a server on the LAN instead of the Internet. The cloud storage 130 may be replaced with an e-mail server and may send an e-mail with a scanned image attached.

<Hardware Configuration of MFP>

Figure 2:
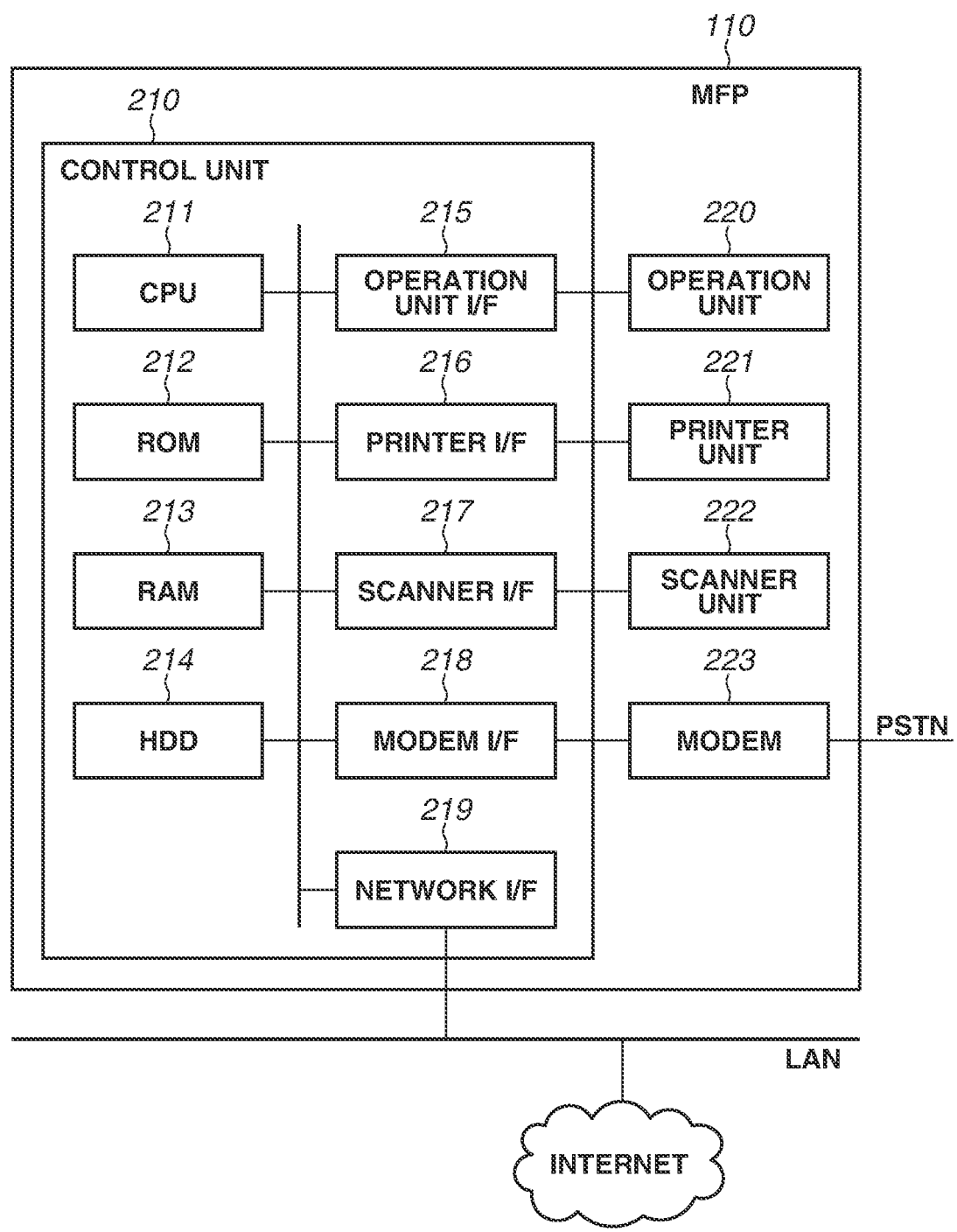
FIG. 2 illustrates a hardware configuration example of a multifunction peripheral (MFP).

FIG. 2 is a hardware configuration diagram of the MFP 110. The MFP 110 includes a control unit 210, an operation unit 220, a printer unit 221, a scanner unit 222, and a modem 223.

The control unit 210 includes units 211 to 219 to be described below, and controls the entire MFP 110. A central processing unit (CPU) 211 reads a control program stored in a read-only memory (ROM) 212, and performs and controls various functions of the MFP 110, such as a reading, printing, and communication functions. A random access memory (RAM) 213 is used as a temporary storage area such as a main memory or a work area of the CPU 211. In the present exemplary embodiment, a single CPU 211 is described to perform various processes illustrated in flowcharts to be described below by using a single memory (RAM 213 or hard disk drive (HDD) 214). However, this is not restrictive. For example, the processes may be performed by cooperation of a plurality of CPUs and a plurality of RAMs or HDDs. The HDD 214 is a mass storage unit for storing image data and various programs. An operation unit interface (I/F) 215 is an I/F for connecting the operation unit 220 with the control unit 210.

The operation unit 220 includes a touch panel and a keyboard, and accepts operations, inputs, and instructions provided by a user. A printer I/F 216 is an I/F for connecting the printer unit 221 with the control unit 210. Print image data is transferred from the control unit 210 to the printer unit 221 via the printer I/F 216, and printed on a recording medium. A scanner I/F 217 is an I/F for connecting the scanner unit 222 with the control unit 210.

The scanner unit 222 reads a document set on a not-illustrated platen or auto document feeder (ADF) to generate image data, and inputs the image data into the control unit 210 via the scanner I/F 217. The MFP 110 has a function of printing and outputting (copying) the image data generated by the scanner unit 222 from the printer unit 221, a function of transmitting the image data as a file over a network, and a function of transmitting an e-mail with the image data attached. A modem I/F 218 is an I/F for connecting the modem 223 with the control unit 210.

The modem 223 implements facsimile communication of image data with a facsimile apparatus on the Public Switched Telephone Network (PSTN). A network I/F 219 is an I/F for connecting the control unit 210 (MFP 110) to the LAN. The MFP 110 transmits image data and information to various services on the Internet and receives various types of information by using the network I/F 219.

<Hardware Configuration of Client PC and MFP Cooperation Service>

Figure 3:
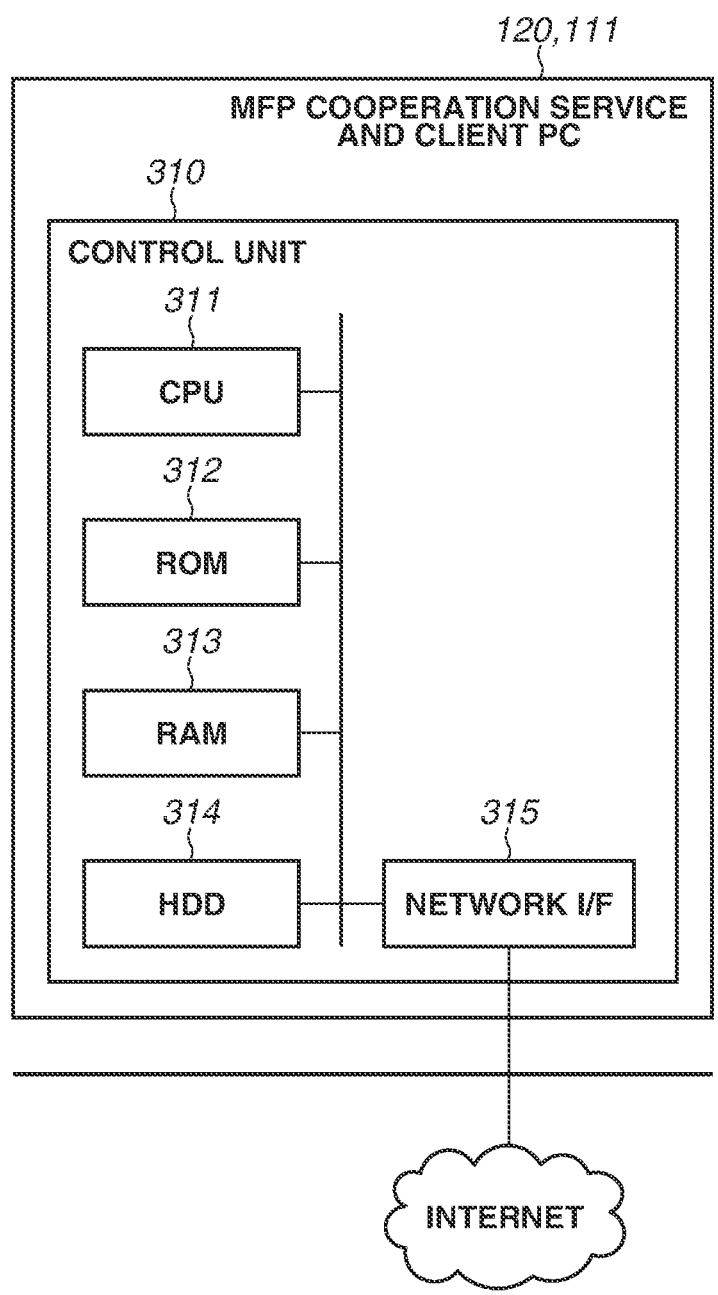
FIG. 3 illustrates a hardware configuration example of a client personal computer (PC) and an MFP cooperation service.

FIG. 3 illustrates a hardware configuration example of an information processing apparatus that can implement each of the client PC 111 and the MFP cooperation service 120. The apparatus for implementing each of the client PC 111 and the MFP cooperation service 120 includes a CPU 311, a ROM 312, a RAM 313, an HDD 314, and a network I/F 315. The CPU 311 controls overall operation by reading a control program stored in the ROM 312 and performing various types of processing. The control program is installed via various networks such as the Internet and an intranet, or a computer readable storage medium such as a compact disc read-only memory (CD-ROM) and a Universal Serial Bus (USB) memory. The RAM 313 is used as a temporary storage area such as a main memory or a work area of the CPU 311. The HDD 314 is a mass storage unit for storing image data and various programs. The network I/F 315 is an I/F for connecting the client PC 111 or the MFP cooperation service 120 to the Internet. The MFP cooperation service 120 receives a processing request from another apparatus (such as the MFP 110) via the network I/F 315, and transmits and receives various types of information.

<Software Configuration of Image Processing System>

Figure 4:
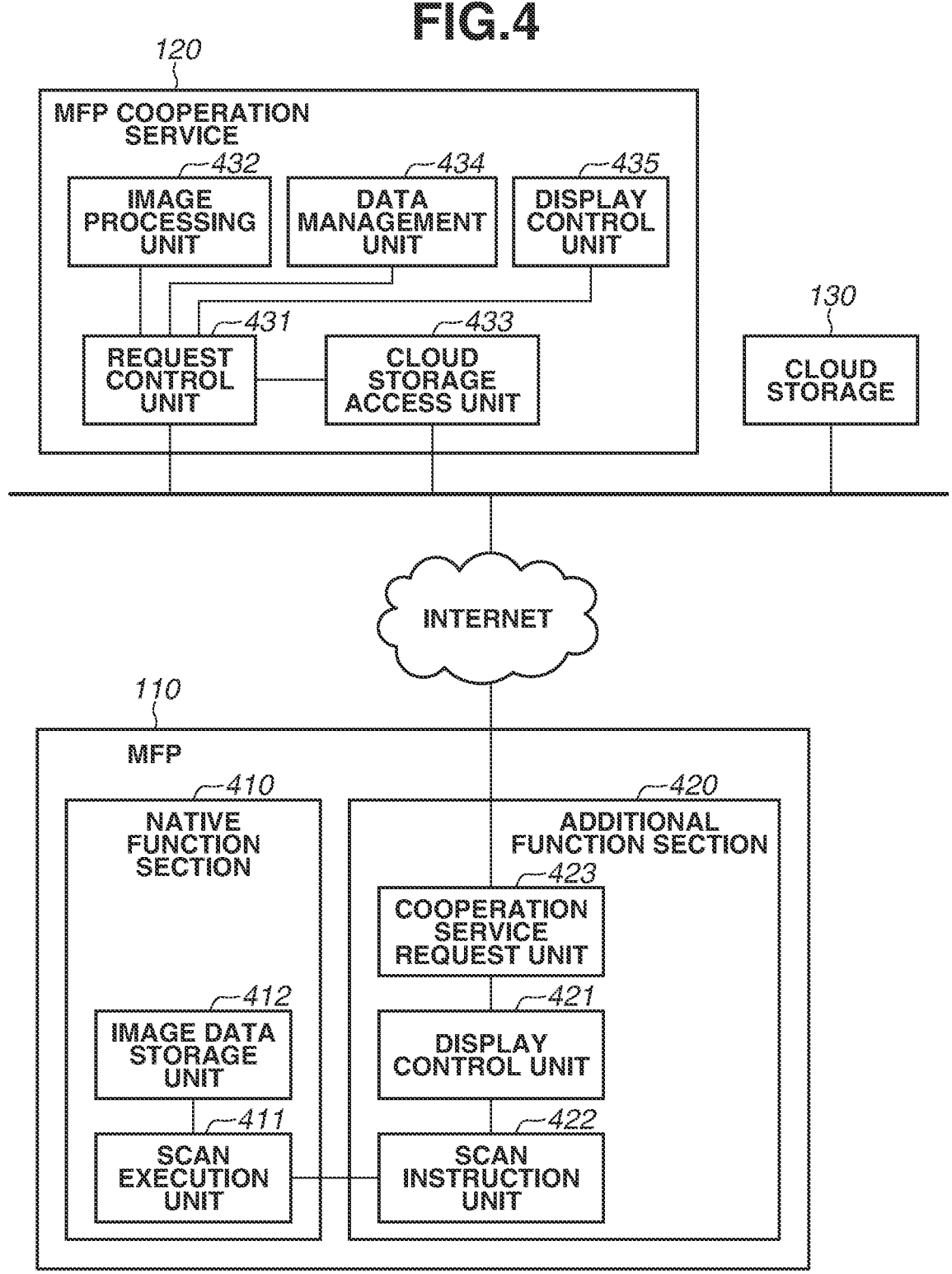
FIG. 4 illustrates a software configuration example of the system.

FIG. 4 illustrates a software configuration example related to programs executed by the MFP 110 and the MFP cooperation service 120 in the image processing system according to the present exemplary embodiment. The MFP 110 is broadly divided into two sections, a native function section 410 and an additional function section 420. While the processing units included in the native function section 410 are ones included in the MFP 110 by default, the additional function section 420 is implemented by an application additionally installed on the MFP 110. For example, the additional function section 420 is an application based on Java (registered trademark) and can easily add functions to the MFP 110. Although not illustrated, other additional applications may also be installed on the MFP 110.

The native function section 410 includes a scan execution unit 411 and an image data storage unit 412. The additional function section 420 includes a display control unit 421, a scan instruction unit 422, and a cooperation service request unit 423.

The display control unit 421 displays a user interface (UI) screen for accepting user's operations on a liquid crystal display unit of the operation unit 220 of the MFP 110, which has a touch panel function. For example, the display control unit 421 displays a UI screen such as a screen for inputting authentication information for accessing the MFP cooperation service 120, a screen for making scan settings, and a screen for making a scan start operation, as well as a screen for displaying a preview image. The scan instruction unit 422 transmits a scan request including the scan settings based on user instructions input via the UI screen to the scan execution unit 411.

The scan execution unit 411 receives the scan request including the scan settings from the scan instruction unit 422. The scan execution unit 411 generates scan image data by controlling the scanner unit 222 via the scanner I/F 217 to read a document placed on a platen glass based on the scan request. The generated scan image data is transmitted to the image data storage unit 412. The scan execution unit 411 transmits a scan image identifier uniquely identifying the stored scan image data to the scan instruction unit 422. Examples of the scan image identifier (not illustrated) include a number, symbol, and alphabetical letter for uniquely identifying the image scanned by the MFP 110. The image data storage unit 412 stores the scan image data received from the scan execution unit 411 into the HDD 214.

The scan instruction unit 422 further obtains the scan image data corresponding to the scan image identifier received from the scan execution unit 411 from the image data storage unit 412. The scan instruction unit 422 then requests a cooperation service request unit 423 to instruct the MFP cooperation service 120 to perform desired processing on the obtained scan image data.

The cooperation service request unit 423 requests various types of processing from the MFP cooperation service 120. For example, the cooperation service request unit 423 requests login, analysis of a scan image, and transmission of a scan image. The cooperation service request unit 423 communicates with the MFP cooperation service 120 by using a protocol such as a representational state transfer (REST) protocol or the Simple Object Access Protocol (SOAP), whereas other communication means may be used.

The MFP cooperation service 120 includes a request control unit 431, an image processing unit 432, a cloud storage access unit 433, a data management unit 434, and a display control unit 435.

The request control unit 431 is on standby in a state capable of receiving a request from an external apparatus. Receiving a processing request, the request control unit 431 instructs the image processing unit 432, the cloud storage access unit 433, and the data management unit 434 about the processing as appropriate.

The image processing unit 432 performs recognition processing and edit processing on an image. Examples include text region analysis processing on an image, character recognition processing (hereinafter, referred to as optical character recognition (OCR) processing) on the analyzed text region, similar form determination processing (to be described below in the processing of steps S507, S508, and S509 of FIG. 5), and image rotation and tilt correction processing.

The cloud storage access unit 433 requests processing from the cloud storage 130. A cloud service typically publishes various I/Fs for storing a file in a cloud storage or obtaining a stored file by using protocols such as REST and SOAP. The cloud storage access unit 433 operates the cloud storage 130 by using a published I/F of the cloud storage 130.

The data management unit 434 stores user information and various types of setting data to be managed by the MFP cooperation service 120.

The display control unit 435 receives requests from a web browser running on another terminal (not illustrated) such as a PC and a mobile terminal connected via the Internet, and returns screen configuration information (such as Hypertext Markup Language (HTML) and Cascading Style Sheets (CSS) files) to be used for screen display. The user checks user information registered in the MFP cooperation service 120 and changes scan settings via the screen displayed by the web browser.

While FIG. 4 illustrates an example of configuration where the additional function section 420 is installed on the MFP 110, such a configuration is not restrictive. For example, the client PC 111 may include a program for implementing the functions of the additional function section 420.

<Overall Processing Procedure>

Figure 5:
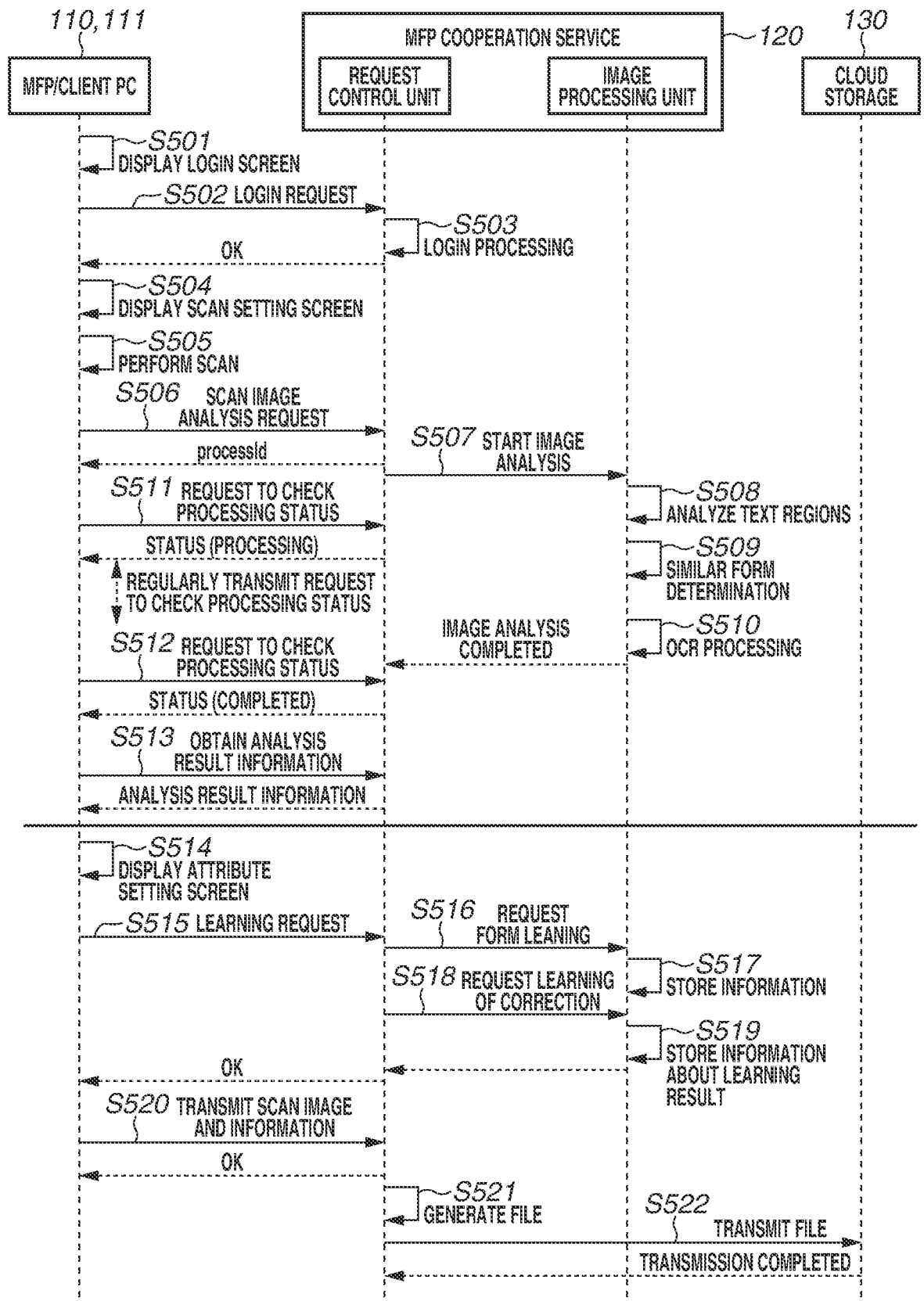
FIG. 5 is a sequence diagram illustrating a processing procedure between apparatuses.

FIG. 5 is a sequence diagram illustrating a processing procedure between the apparatuses in generating a file of an image scanned by the MFP 110 and transmitting the file to the cloud storage 130. Here, transactions between the apparatuses will mainly be described. In FIG. 5, the MFP 110 is illustrated to perform the transactions with the MFP cooperation service 120. However, the client PC 111 may be configured to obtain an analysis result (step S513), provide a screen display (step S514), and give learning instructions (step S515) instead of the MFP 110.

In a normal state, the MFP 110 displays a main screen including an array of buttons for performing various functions on the touch panel. If an additional application for transmitting a scanned form to the cloud storage 130 (hereinafter, referred to as a scan application) is installed on the MFP 110, a button for using the functions of the scan application is displayed on the main screen of the MFP 110. If this button is pressed by the user, the CPU 311 of the MFP 110 executes the scan application, whereby a screen for transmitting a scanned form to the cloud storage 130 is displayed and the processing illustrated in the sequence diagram of FIG. 5 is started.

In step S501, the scan application (MFP 110) displays a login screen for the user to input authentication information (username and password) for accessing the MFP cooperation service 120. If the user inputs the authentication information and presses a login button, then in step S502, a login request is transmitted to the MFP cooperation service 120. In step S503, the MFP cooperation service 120 verifies whether the authentication information (username and password) included in the received login request is correct. If the authentication information is correct, the MFP cooperation service 120 returns an access token to the MFP 110. Various requests the MFP 110 subsequently issues to the MFP cooperation service 120 are transmitted with this access token, and the user making the requests can be identified based on the information about the access token. The user authentication is performed by using a conventional common technique (such as basic access authentication, digest access authentication, and OAuth-based authentication).

After the completion of the login processing, in step S504, the MFP 110 displays a scan setting screen. If the user makes various settings related to scanning, places a paper form to be scanned on the platen glass or the ADF, and presses a "start scan" button, then in step S505, the MFP 110 performs a scan to generate electronic image data on the paper form. In step S506, the MFP 110 transmits a scan image analysis request to the MFP cooperation service 120 along with the generated scan image data. In step S507, the MFP cooperation service 120 receiving the scan image analysis request controls the image processing unit 432 of the MFP cooperation service 120 to start an image analysis on the scan image data (scan image). Here, the MFP cooperation service 120 returns an identifier "processId" for uniquely identifying the analysis requested of the MFP cooperation service 120 to the MFP 110 without waiting for the end of the image analysis processing.

In the image analysis processing performed by the image processing unit 432, first, in step S508, the image processing unit 432 analyzes text regions included in the scan image. In step S509, using layout information about the text regions in the analyzed scan image, the image processing unit 432 compares layout information about text regions in images scanned in the past with the layout information about the text regions in the current scan image, and determines whether there is an image (similar form) where the text regions are in a similar layout. Such processing will be referred to as similar form determination. The layout information about the text regions in the past scan images to be used in the similar form determination is stored and accumulated by the processing of step S517 to be described below. In step S510, the image processing unit 432 performs OCR processing on the analyzed text regions based on the determination result of step S509. Details of the OCR processing in step S510 will be described with reference to FIG. 7.

In step S511, using the identifier "processId" received as a response to the scan image analysis request issued in step S506, the MFP 110 transmits a request to check the processing status of the image analysis corresponding to the identifier "processId" to the MFP cooperation service 120 on a regular basis (for example, at every several hundreds of milliseconds to every several milliseconds or so). Although not illustrated in the diagram, the processing of step S511 continues to be regularly performed until a response indicating the completion of the image analysis by the MFP cooperation service 120 is obtained (until the timing of step S512). The MFP cooperation service 120 receives the request to check the processing status from the MFP 110, checks the status of the requested processing corresponding to the identifier "processId", and returns a response. The response contains a character string indicating the current processing status in its "status" field. For example, if the character string in the "status" field is "processing", the response indicates that the MFP cooperation service 120 is in process. If the character string in the "status" field is "completed", the response indicates that the processing of the MFP cooperation service 120 is completed. A status "failed" can be returned if the processing is failed. The response upon the completion of the processing (the status is "completed") includes the result of the analysis of the scan image and information about the scan settings, along with the status indicating the completion of the processing.

In step S512, if a response including the status indicating the completion of the processing is received as a result of the checking of the processing status, then in step S513, the MFP 110 accesses a Uniform Resource Locator (URL) related to analysis result information included in the response and obtains analysis result information about the scan image. In step S514, the MFP 110 displays an attribute setting screen for setting a filename and metadata of the scan image by using the analysis result information obtained in step S513. FIG. 6B illustrates an example of the attribute setting screen. Details of the attribute setting screen will be described below. If the client PC 111 displays the attribute setting screen and sets the filename and metadata, the attribute setting screen can be displayed by the following procedure. First, the user logs in to the MFP cooperation service 120 from a web browser on the client PC 111. A list (FIG. 6A) of jobs related to scanned forms stored in the MFP cooperation service 120 is displayed, from which a job related to a desired form is selected based on the user's instruction. Then, the web browser on the client PC 111 accesses the URL related to the analysis result information about the scanned form image corresponding to the selected job, obtains the analysis result information, and displays an attribute setting screen for setting the filename and metadata of the form image.

If the user presses an "OK" button 620 after the filename and metadata of the scan form are set on the attribute setting screen, then in step S515, the MFP 110 transmits information about the text regions used to set the filename and the metadata to the MFP cooperation service 120 along with a learning request. If the user has corrected a character string extracted by the OCR processing on the attribute setting screen by using the keyboard, information about the corrected character string (information about the correction content) is also transmitted.

In step S516, the request control unit 431 of the MFP cooperation service 120 receiving the learning request requests form learning from the image processing unit 432. In step S517, the image processing unit 432 stores layout information about all the text regions included in the scan image and the information about the text regions used for the filename and metadata by the user. If the user has corrected the character string extracted by the OCR processing on the attribute setting screen, then in step S518, the request control unit 431 requests learning of the correction of the OCR processing result (OCR result) from the image processing unit 432. In step S519, the image processing unit 432 performs learning processing based on the correction content of the OCR processing result, and stores information about the learning result. Details of step S519 will be described below.

Then, in step S520, the MFP 110 transmits the scan image and the information about the filename and the metadata set on the attribute setting screen to the MFP cooperation service 120 as a request. Receiving the request, the MFP cooperation service 120 starts file generation processing based on the received scan image, and returns a response indicating that the request is properly received to the MFP 110. Receiving the response to the transmission, the MFP 110 ends the processing and returns to the display of the scan setting screen in step S504. In step S521, the MFP cooperation service 120 obtains information about a file format for transmitting the scan image to the cloud storage 130 based on the scan settings registered in the MFP cooperation service 120, and generates the file of the scan image based on the format information. Then, in step S522, the MFP cooperation service 120 sets the filename received in step S520 as the file name of the file generated in step S521, and transmits the file to the cloud storage 130.

FIGS. 6A and 6B are diagrams illustrating examples of screens displayed on the MFP 110 (or client PC 111). FIG. 6A is a diagram illustrating an example of a scanned form list screen 600. The scanned form list screen 600 displays a list (scanned form list) 601 of jobs related to scanned form images of which the scan and the image analysis processing (steps S505 to S510) are completed and that are temporarily stored in the MFP cooperation service 120 before transmission to the cloud storage 130. Aside from the scanned form list 601, the scanned form list screen 600 also includes a send button 602, an edit button 603, and a delete button 604.

The scanned form list 601 includes a form name 605, a destination 606, a status 607, and a type 608. The form name 605 indicates an identifier for uniquely identifying the name of a form. The destination 606 indicates the name of the cloud storage 130 to transmit the file of the form image to. The status 607 indicates the result of the similar form determination performed on the form image. The status 607 indicates either "not learned" or "learned". "Not learned" means that there is determined to be no similar form. "Learned" means that there is determined to be a similar form. The type 608 indicates the type of form automatically determined based on the OCR result of a character string of a title in the form image and, if a similar form is found by the similar form determination, the type of the similar form. Examples include "quotation" and "invoice". If the status 607 is "learned", a detailed type indicating what invoice format the form corresponds to, such as "invoice AAA" or "invoice BBB", is also displayed. The detailed type is that associated with a form determined to be the most similar by the similar form determination processing.

The send button 602 is a button for transmitting a form image to the cloud storage 130. If a job related to a form image is selected from the scanned form list 601 by the user's operation and the send button 602 is pressed, the MFP cooperation service 120 transmits the selected form image to the cloud storage 130 set in the destination 606. If the transmission is normally completed, the job related to the form image is deleted from the scanned form list 601.

The edit button 603 is a button for transitioning to an attribute setting screen 610 to be described below. If a job related to a form image is selected from the scanned form list 601 by the user's operation and the edit button 603 is pressed, the screen transitions to the attribute setting screen 610 for setting attributes related to the selected form image.

The delete button 604 is a button for deleting a form. If a job related to a form image is selected from the scanned form list 601 by the user's operation and the delete button 604 is pressed, the job related to the selected form image is deleted.

FIG. 6B is a diagram illustrating an example of the attribute setting screen 610 for setting attribute information, such as a filename and metadata, for the form image. An attribute area 611 is an area for displaying the attribute information set for the form image. The attribute area 611 displays the item names of attributes such as "filename" and "company name", and includes text fields and clipped image display areas under the respective item names. For example, a text field 618 for inputting attribute information and a clipped image 619 related to the text region used to input the attribute information, as will be described below, are displayed under the item name "company name". If there is determined to be no similar form in step S509 (i.e., in the case of a not-learned form), the attribute setting screen 610 is displayed with no text regions selected (in a state where the text fields are empty and no clipped images are set). On the other hand, if there is determined to be a similar form in step S509, character recognition results of text regions at corresponding positions of the form image to be processed and clipped images of the text regions are automatically displayed in the text fields and the clipped image display areas based on position information about the text regions selected in the similar form in the past.

A preview area 612 displays a preview image of the scanned form.

If the attribute information about the respective items in the attribute area 611 is set by using the client PC 111, the settings can be made as follows. If, for example, the user selects the item "company name" and then places a mouse over a desired text region in the preview image, the moused-over text region is highlighted (for example, the text region is displayed with a color frame) based on the analysis result information obtained in step S513. Here, the character string of the character recognition result in the moused-over text region is displayed in the text field 618, and the clipped image of the text region is displayed in the clipped image display area 619. Each time a different text region is moused over in the preview image, the display contents of the text field 618 and the clipped image display area 619 are switched accordingly. If the user clicks the mouse on a desired text region, the character recognition result and the clipped image of the mouse-clicked text region are set into the text field 618 and the clipped image display area 619 under the selected item name as fixed inputs. The character string input to the text field based on the character recognition result is capable of correction processing, such as correction of misrecognized characters and deletion of unnecessary characters, by using the keyboard (not illustrated) of the client PC 111.

If the attribute information about the items in the attribute area 611 is set by touch operation on the MFP 110, the user selects a desired attribute item and then touches a desired text region. Then, the character recognition result and the clipped image corresponding to the touched text region are set. The text region used to set the attribute information is highlighted on the preview image.

A text region deletion button 613 is a button for clearing the text region used to set attribute information, and displayed at the upper right of the highlighted text region. If the text region deletion button 613 is pressed, the attribute information set in the attribute area 611 based on the text region is cleared, and the text region stops being highlighted on the preview image.

A preview zoom-in button 614 is an operation button for increasing the magnification ratio of the preview image displayed in the preview area 612. A preview zoom-out button 615 is an operation button for reducing the magnification ratio of the preview image displayed in the preview area 612. A preview initial display button 616 is an operation button for restoring an initial magnification ratio and an initial display position in a case where the magnification ratio has been changed by pressing the preview zoom-in button 614 or the preview zoom-out button 615 or in a case where the display position of the preview image has been moved by an operation such as swipe.

An OK button 620 is a button for giving an instruction to transmit the attribute information (filename and metadata such as a company name) set on the attribute setting screen 610 and the position information about the text regions used to set the attribute information to the MFP cooperation service 120. If correction processing has been performed on the character string of the character recognition result in a text field, the information about the correction content is also transmitted in response to the pressing of the OK button 620. If the OK button 620 is pressed and the transmission of the information is completed, the screen returns to the scanned form list screen 600. The MFP cooperation service 120 receives the information, and performs learning processing (steps S516 to S519) based on the result of the text region analysis processing and the correction made to the OCR result.

FIG. 7 is a flowchart illustrating details of the learning processing (step S519) based on the correction content of an OCR result if the OCR result is corrected in setting the attribute information on the attribute setting screen 610. Details of processing for processing a new form image by using the learning result of the learning processing in FIG. 7 will be described below with reference to FIG. 9.

If the user corrects the character string of the character recognition result displayed in a text field on the attribute setting screen 610, the information about the correction content is transmitted from the client PC 111 (or MFP 110) in step S515. In such a case, in step S701, the image processing unit 432 of the MFP cooperation service 120 obtains the information about the correction content. For example, suppose that, as illustrated in FIG. 6B, "Shimomaruko Inc" that is the OCR processing result of the text area 617 selected on the preview image is displayed in the text field 618. Suppose also that the user determines that the part "Inc" is not needed, and deletes that part and leaves the character string "Shimomaruko" as in a text field 813 of FIG. 8. If such a deletion operation is performed on the character string, an attribute setting screen 810 can be controlled to highlight a text region 811 corresponding to the character string of the OCR result remaining in the text field 813 and display a clipped image 812 corresponding to the text region 811. If the deletion operation is performed, the client PC 111 (or MFP 110) determines that the character string of the OCR processing result is corrected, and transmits information about the deleted character string as the information about the correction content. While the MFP cooperation service 120 is described here to obtain the information about the correction content transmitted from the client PC 111 (or MFP 110), this is not restrictive. For example, the client PC 111 (or MFP 110) may be configured to transmit the uncorrected character string of the OCR result and the corrected character string, so that the MFP cooperation service 120 obtains the correction content by extracting a difference between the uncorrected and corrected character strings to identify the deleted character string.

In step S702, the image processing unit 432 determines whether the correction content is the deletion of a part of the character string of the OCR result and the deleted characters constitute a character string registered in a general term dictionary. The general term dictionary refers to a dictionary in which character strings other than proper nouns, such as "Inc" and "quotation", are registered. For example, if "Inc" is deleted from "Shimomaruko Inc" as illustrated in FIG. 8, the correction content is determined to be the deletion of the character string "Inc", and "Inc" is determined to be a character string registered in the general term dictionary. In such a case (YES in step S702), the processing proceeds to step S703. In step S703, the image processing unit 432 generates a regular expression based on the original character string and the deleted character string, and learns the correction content of the OCR processing result. For example, if "Inc" is deleted from "Shimomaruko Inc" as illustrated in FIG. 8, the image processing unit 432 learns the correction content of the OCR processing result by registering the regular expression ".*Inc" and the target form number (number assigned to forms of the same format) as in Table 1 below. The form number determined during the similar form determination in step S509 is used as the target form number. Since the same form number is assigned to forms where text regions are in the same layout (forms that are determined to be in the same format), whether to reflect a learning result is determined based on the form number in performing OCR processing on a new form image as will be described below.

TABLE 1

| No. | Regular expression | Target form number |
| --- | --- | --- |
| 1 | .*Inc | 1 |

In the example of FIG. 8, a regular expression such as one illustrated in Table 1 is described to be generated in deleting the latter part of the character string of the OCR result. However, this is not restrictive. For example, a regular expression expressing correction content is similarly generated if characters in the first part or in the middle of the character string of the OCR result are deleted and the deleted character string is registered in the general term dictionary.

In step S704, the image processing unit 432 analyzes the uncorrected character string and the corrected character string of the OCR processing result, and learns the correction to the OCR processing result based on a result of the analysis. For example, if the OCR processing result of the selected text region is a character string "AL" and the user corrects the character string to "AI" (the character string includes a character "I" misrecognized as "L", and the user corrects the misrecognition), the image processing unit 432 registers "AL" as a target character string (character string before replacement) and "AI" as a replaced character string as illustrated in Table 2 below. Similar to Table 1, the form number determined during the similar form determination in step S509 is used as the target form number.

TABLE 2

| No. | Target character string | Replaced character string | Target form number |
| --- | --- | --- | --- |
| 1 | AL | AI | 2 |

As described above, by the learning processing of steps S703 and S704, regular expression information illustrated in Table 1 and replaced character string information illustrated in Table 2 are stored. If a new form image of the same format is subsequently scanned, the OCR result can be automatically corrected by using the information (learning data) illustrated in Tables 1 and 2 when the character recognition processing of step S510 is performed on the new form image.

Figure 9:
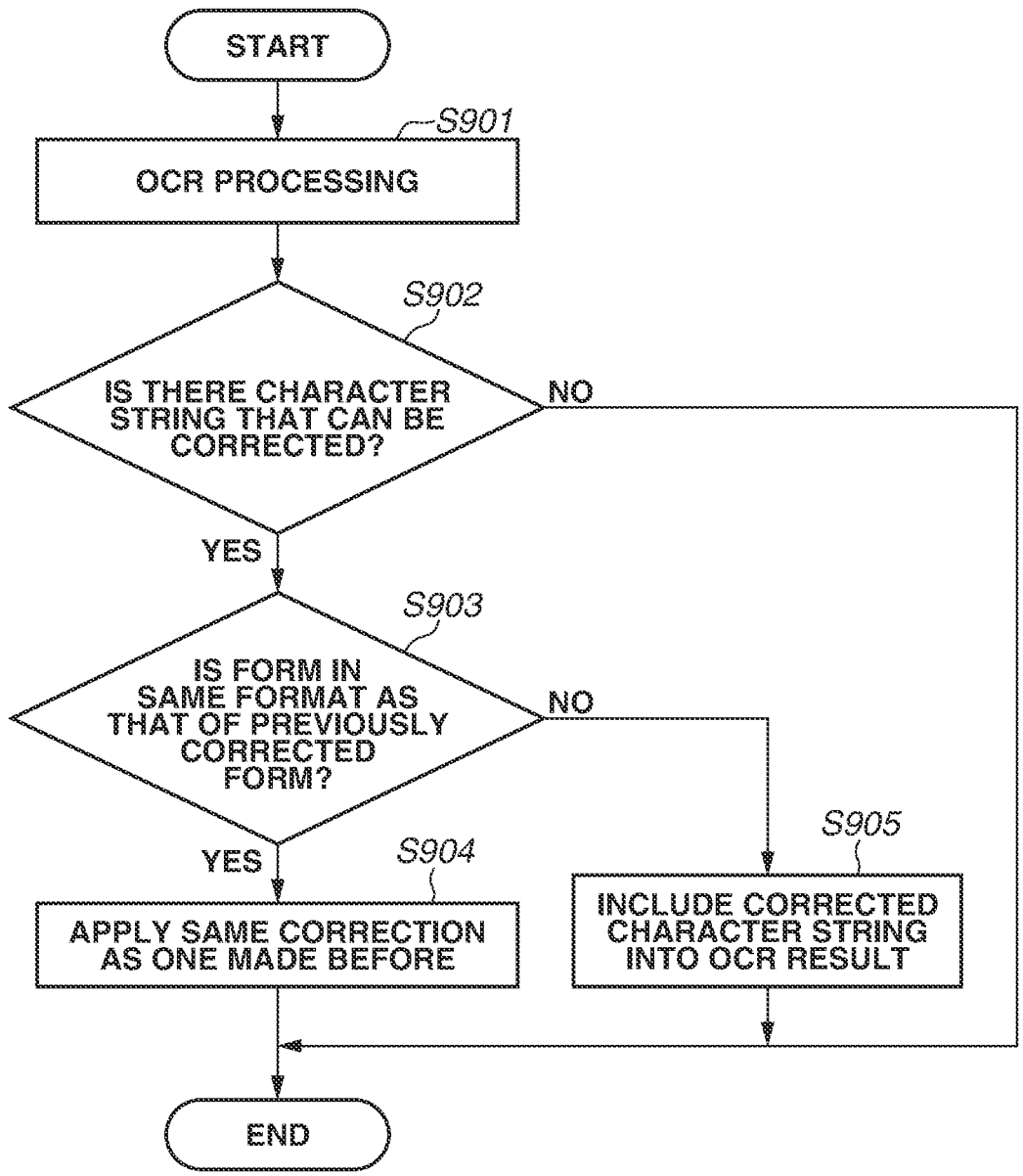
FIG. 9 is a flowchart illustrating details of correction processing in performing character recognition processing on a new image.

FIG. 9 is a detailed flowchart of the processing for correcting the OCR result by using the learning data illustrated in the foregoing Tables 1 and 2 in performing the character recognition processing of step S510 on a new form image.

In step S901, the image processing unit 432 of the MFP cooperation service 120 obtains character strings that are the character recognition result by performing the character recognition (OCR) processing on the partial images corresponding to the respective text regions analyzed in step S508.

In step S902, the image processing unit 432 determines whether there is a character string that can be corrected by comparing the character strings of the OCR processing result obtained in step S901 with the regular expression in Table 1 and the target character string in Table 2. In other words, if a character string of the OCR processing result matches the regular expression in Table 1 or the target character string in Table 2, the image processing unit 432 determines that the character string can be corrected (YES in step S902), and the processing proceeds to step S903.

In step S903, the image processing unit 432 determines whether the new form image to be processed is determined as having a similar form in step S509 and whether the form number of the determined similar form is among form numbers in at least one of Tables 1 and 2. In other words, the image processing unit 432 determines whether the form scanned to generate the new form image this time is in the same format as that of a previously OCR-corrected form. If the form is determined to be in the same format as that of a previously corrected form (YES in step S903), the processing proceeds to step S904. In step S904, the image processing unit 432 automatically applies the same correction as the one made before to the current OCR result. On the other hand, if the form is determined to be in a different format (NO in step S903), the processing proceeds to step S905. In step S905, the image processing unit 432 includes the corrected character string into the OCR result so that the OCR result can be presented to the user. In such a manner, whether to apply the same correction as the one made before to the current OCR result can be determined based on the user's instruction.

In other words, in step S904, the image processing unit 432 corrects the character string of the character recognition result obtained in step S901. Specifically, if the character string of the character recognition result matches the regular expression in Table 1, the image processing unit 432 deletes the character string part expressed by the regular expression. If the character string of the character recognition result agrees with the target character string in Table 2, the image processing unit 432 replaces the character string of the character recognition result with the corresponding replaced character string in Table 2. For example, suppose that a form image of FIG. 10 similar to that of FIG. 8 is scanned, and "Kosugi Inc" is obtained as an initial result of the character recognition in the text region corresponding to the text region 811 of FIG. 8. In such a case, since the character string of the character recognition result matches the regular expression ".*Inc" registered in Table 1, the image processing unit 432 outputs a character string obtained by deleting "Inc" as the OCR processing result. Specifically, a character string "Kosugi" and the corresponding coordinates are output as in OCR processing result data in FIG. 11. In displaying the attribute setting screen in step S514 based on this output result, the character string "Kosugi" is displayed in a text field 1013 as illustrated in FIG. 10. A clipped partial image of the "Kosugi" part is displayed in a clipped image display area 1012. A corresponding text region 1011 is highlighted on the preview image.

In step S905, the image processing unit 432 outputs both the character string of the character recognition result obtained in step S901 and the character string corrected based on the information in Table 1 or 2 as an OCR processing result. For example, suppose that the form image to be processed this time is determined as having no similar form in step S903, and the character string obtained by the character recognition of a selected text region matches the regular expression ".*Inc" in Table 1. In the case of FIG. 12, two character strings, namely, a character string "Kawasaki Inc" that is the character recognition result of a selected text region 1211 and a character string "Kawasaki" obtained by deleting the "Inc" part based on the regular expression in Table 1 are output as OCR processing result data. Specifically, as illustrated in FIG. 13, the character string "Kawasaki Inc" that is the character recognition result of the target text region 1211 and its replaced character string candidate "Kawasaki" are output as the OCR processing result data. Then, as illustrated in FIG. 12, the character strings are displayed as a dropdown list in a text field 1212 based on the OCR processing result data. If the user selects "Kawasaki" in the dropdown list (i.e., the replaced character string candidate is selected), a form number related to the new form image may be additionally registered in the target form number in Table 1 or 2, and the form may be used as a similar form thereafter.

In the present exemplary embodiment, whether to automatically replace a character string with the replaced character string or display the character string as a candidate is determined in step S903 of FIG. 9 based on the form number of the similar form. However, other conditions may also be used. For example, whether to apply the correction content of Tables 1 and 2 may be determined user by user or with respect to each group to which users belong.

As described above, if the character string of the character recognition result of a text region in a scan image is corrected in setting attribute information such as a filename and metadata by using the character string of the character recognition result, the correction content is registered. In setting attribute information about a new scan image, the registered correction content is reflected on the display of the character string of the character recognition result. This can reduce the user's time and effort to correct the character string of the character recognition result.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-063778, filed on Mar. 31, 2020 which is hereby incorporated by reference herein in its entirety.

What is claimed is:

1. An information processing apparatus comprising:
at least one memory that stores instructions; and
at least one processor that executes the instructions to perform:
  obtaining a first character recognition result by performing character recognition processing on a text region in a first scan image; and
  learning, if a part of a character string of the first character recognition result is deleted in setting attribute information about the first scan image, a regular expression based on the deleted character string,
wherein, if a character string of a second character recognition result obtained by performing a character recognition processing on a text region in a second scan image matches the learned regular expression, the second character recognition result is corrected by deleting a part matching the learned regular expression from the character string of the second character recognition result.

2. The information processing apparatus according to claim 1,
wherein, if a part of the character string of the first character recognition result is replaced in setting the attribute information about the first scan image, the learning learns the character string before replacement and the replaced character string, and
wherein, if a character string of the second character recognition result matches the learned character string before replacement, the second character recognition result is corrected by replacing the character string of the second character recognition result with the learned replaced character string.

3. An information processing apparatus comprising:
at least one memory that stores instructions; and
at least one processor that executes the instructions to perform:
  obtaining a first character recognition result by performing character recognition processing on a text region in a first scan image; and
  learning, if a part of a character string of the first character recognition result is deleted in setting attribute information about the first scan image and the deleted part of the character string is a character string registered in a predetermined term dictionary, a regular expression based on the deleted part of the character string, wherein, if a character string of a second character recognition result obtained by performing a character recognition processing on a text region in a second scan image matches the learned regular expression, the second character recognition result is corrected by deleting a part matching the regular expression from the character string of the second character recognition result.

4. The information processing apparatus according to claim 3,
wherein, if a part of the character string of the first character recognition result is replaced in setting the attribute information about the first scan image, the learning learns the character string before replacement and the replaced character string, and
wherein, if a character string of the second character recognition result matches the learned character string before replacement, the second character recognition result is corrected by replacing the character string of the second character recognition result with the learned replaced character string.

5. An information processing apparatus comprising:
at least one memory that stores instructions; and
at least one processor that executes the instructions to perform:
obtaining a first character recognition result by performing character recognition processing on a text region in a first scan image; and
learning, if a part of a character string of the first character recognition result is replaced in setting attribute information about the first scan image, the character string before replacement and the replaced character string,
wherein, if a character string of a second character recognition result obtained by performing a character recognition processing on a text region in a second scan image matches the learned character string before replacement, the second character recognition result is corrected by replacing the character string of the second character recognition result with the learned replaced character string.

6. A non-transitory computer readable storage medium storing instructions that cause a computer to perform:
obtaining a first character recognition result by performing character recognition processing on a text region in a first scan image; and
learning, if a part of a character string of the first character recognition result is deleted in setting the attribute information about the first scan image, a regular expression based on the deleted character string,
wherein, if a character string of a second character recognition result obtained by performing a character recognition processing on a text region in a second scan image matches the learned regular expression, the second character recognition result is corrected by deleting a part matching the learned regular expression from the character string of the second character recognition result.

7. The non-transitory computer readable storage medium according to claim 6,
wherein, if a part of the character string of the first character recognition result is replaced in setting the attribute information about the first scan image, the learning learns the character string before replacement and the replaced character string, and
wherein, if a character string of the second character recognition result matches the learned character string before replacement, the second character recognition result is corrected by replacing the character string of the second character recognition result with the learned replaced character string.

8. A non-transitory computer readable storage medium storing instructions that cause a computer to perform:
obtaining a first character recognition result by performing character recognition processing on a text region in a first scan image; and
learning, if a part of a character string of the first character recognition result is deleted in setting attribute information about the first scan image and the deleted part of the character string is a character string registered in a predetermined term dictionary, a regular expression based on the deleted part of the character string,
wherein, if a character string of a second character recognition result obtained by performing a character recognition processing on a text region in a second scan image matches the learned regular expression, the second character recognition result is corrected by deleting a part matching the regular expression from the character string of the second character recognition result.

9. The non-transitory computer readable storage medium according to claim 8,
wherein, if a part of the character string of the first character recognition result is replaced in setting the attribute information about the first scan image, the learning learns the character string before replacement and the replaced character string, and
wherein, if a character string of the second character recognition result matches the learned character string before replacement, the second character recognition result is corrected by replacing the character string of the second character recognition result with the learned replaced character string.

10. A non-transitory computer readable storage medium storing instructions that cause a computer to perform:
obtaining a first character recognition result by performing character recognition processing on a text region in a first scan image; and
learning, if a part of a character string of the first character recognition result is replaced in setting attribute information about the first scan image, the character string before replacement and the replaced character string,
wherein, if a character string of a second character recognition result obtained by performing a character recognition processing on a text region in a second scan image matches the learned character string before replacement, the second character recognition result is corrected by replacing the character string of the second character recognition result with the learned replaced character string.

11. An information processing method to be performed by an information processing apparatus, the information processing method comprising:
obtaining a first character recognition result by performing character recognition processing on a text region in a first scan image; and
learning, if a part of a character string of the first character recognition result is deleted in setting attribute information about the first scan image, a regular expression based on the deleted character string,
wherein, if a character string of a second character recognition result obtained by performing a character recognition processing on a text region in a second scan image matches the learned regular expression, the second character recognition result is corrected by deleting a part matching the learned regular expression from the character string of the second character recognition result.

12. The information processing method according to claim 11,
wherein, if a part of the character string of the first character recognition result is replaced in setting the attribute information about the first scan image, the learning learns the character string before replacement and the replaced character string, and
wherein, if a character string of the second character recognition result matches the learned character string before replacement, the second character recognition result is corrected by replacing the character string of the second character recognition result with the learned replaced character string.

13. An information processing method to be performed by an information processing apparatus, the information processing method comprising:
obtaining a first character recognition result by performing character recognition processing on a text region in a first scan image; and
learning, if a part of a character string of the first character recognition result is deleted in setting attribute information about the first scan image and the deleted part of the character string is a character string registered in a predetermined term dictionary, a regular expression based on the deleted part of the character string,
wherein, if a character string of a second character recognition result obtained by performing a character recognition processing on a text region in a second scan image matches the learned regular expression, the second character recognition result is corrected by deleting a part matching the regular expression from the character string of the second character recognition result.

14. The information processing method according to claim 13,
wherein, if a part of the character string of the first character recognition result is replaced in setting the attribute information about the first scan image, the learning learns the character string before replacement and the replaced character string, and
wherein, if a character string of the second character recognition result matches the learned character string before replacement, the second character recognition result is corrected by replacing the character string of the second character recognition result with the learned replace character string.

15. An information processing method to be performed by an information processing apparatus, the information processing method comprising:
obtaining a first character recognition result by performing character recognition processing on a text region in a first scan image; and
learning, if a part of a character string of the first character recognition result is replaced in setting attribute information about the first scan image, the character string before replacement and the replaced character string,
wherein, if a character string of a second character recognition result obtained by performing a character recognition processing on a text region in a second scan image matches the learned character string before replacement, the second character recognition result is corrected by replacing the character string of the second character recognition result with the learned replaced character string.

* * * * *